United States Patent [19]

Gruenke et al.

[11] 3,880,147
[45] Apr. 29, 1975

[54] R-R INTERVAL HISTOGRAM INSTRUMENT SYSTEM

[75] Inventors: Roger A. Gruenke, Columbus, Ohio; Roy J. Lahr, Sierra Madre, Calif.

[73] Assignee: Xerox Corporation, Rochester, N.Y.

[22] Filed: Mar. 22, 1973

[21] Appl. No.: 343,747

[52] U.S. Cl. ..... 128/2.06 A; 128/2.06 F; 324/77 R; 324/181
[51] Int. Cl. .............................................. A61b 5/04
[58] Field of Search ..... 128/2.06 R, 2.06 A, 2.06 F, 128/2.06 G, 2.05 P, 2.05 S, 2.05 T, 2 G, 2.1 B; 324/77 R, 181; 328/129, 130

[56] References Cited
UNITED STATES PATENTS

| | | | |
|---|---|---|---|
| 3,241,432 | 3/1966 | Skeggs et al. | 128/2 G |
| 3,513,834 | 5/1970 | Suzuki et al. | 128/2.1 B |
| 3,524,442 | 8/1970 | Horth | 128/2.06 A |
| 3,557,354 | 1/1971 | Trimble | 324/77 R |
| 3,568,054 | 3/1971 | Ross | 324/77 R |
| 3,633,569 | 1/1972 | Brayshaw | 128/2.06 A |
| 3,658,055 | 4/1972 | Abe et al. | 128/2.06 A |
| 3,661,147 | 5/1972 | Mason | 128/2.05 T |
| 3,773,038 | 11/1973 | Smith | 128/2.06 F |
| 3,820,025 | 6/1974 | Lahr et al. | 128/2.06 A |

Primary Examiner—Richard A. Gaudet
Assistant Examiner—Lee S. Cohen
Attorney, Agent, or Firm—Fulwider, Patton, Rieber, Lee & Utecht

[57] ABSTRACT

A method and apparatus for generating an R—R interval histogram by collecting and processing electrocardiograph signal data over a relatively long time period. The system includes a data collection section and a data readout section with the data collection section being portable permitting a patient to wear the device for long time periods without impairing freedom of motion. R—R intervals are continuously sensed and each interval is used to increment one of a plurality of R—R interval memory locations. The count in each memory location then depends upon the number of particular R—R intervals generated over the total time period that the patient is montiored. At the conclusion of the monitoring time, the data collection section is connected to the data readout section and the count in each memory location is sequentially readout and processed to form a bar graph indication of the logarithm of the total count in that location, the complete graph being a histogram of R—R intervals. An alternate data collection technique involves recording the time difference between each R—R interval which, when read out, produces a R—R distance histogram.

7 Claims, 9 Drawing Figures

R-R INTERVAL HISTOGRAM INSTRUMENT SYSTEM

BACKGROUND OF THE INVENTION

1. Field of the Invention

The present invention relates to the production of a graphical display of data, and more particularly, to a system for collecting electrocardiogram data over relatively long time periods and processing that data to produce an R-R interval histogram.

2. Description of the Prior Art

In the field of cardiology, it has been generally recognized that arrythemia, or irregular heartbeats, may be an important warning sign of impending heart problems. In order to measure and study arrythemic activity, a commonly used technique is to produce a bar chart or histogram of the relative frequency of the occurrence of particular intervals between heartbeats. Typically, the interval between heartbeats can be most easily detected by measuring the time difference between the relatively prominent "R" portion of the electrocardiogram waveform and the resultant graphical display is commonly known as an R-R interval histogram.

As a meaningful R-R interval histogram requires monitoring the patient over a relatively long time period, usually measured in hours, a number of methods have been proposed for automatically measuring and processing the R-R interval information to produce the histogram. Among these techniques has been the continuous recording of the electrocardiograph information on tape for later playback at a higher speed for analysis. The analysis can be as simple as a cardiologist monitoring the high speed waveforms for arrythemias or the processing of the recorded information to produce a graphical R-R histogram. Many of such tape systems utilize radio links between a portable device carried by the patient and the actual tape recording equipment. These systems permit the patient a wider field of motion but it is still limited by the range of the radio links involved and the time and equipment necessary for processing tape recordings made over considerable periods of time.

It will be apparent from the foregoing that there has long been a need for a simple and inexpensive system for producing graphical R-R interval histograms which would permit monitoring a patient over a considerable time period but would permit him to move about in an ordinary manner to produce a more accurate and representative histogram. The instrument system of the present invention satisfies that need.

SUMMARY OF THE INVENTION

The instrument system of the present invention provides a method and apparatus for collecting R-R interval data from an electrocardiograph signal and processing that data to generate an R-R interval histogram directly. The system of the invention includes a data collection section in which the electrocardiograph signal information is preprocessed directly into R-R interval data and stored in a suitable memory unit for later readout. The data collection section is adapted for connection to a readout section which directly accepts the R-R interval data as preprocessed and generates appropriate graphical readout signals in response thereto. The readout signals generated by the readout section are dependent upon the graph generating device in use which, for the presently preferred embodiment, is a strip chart recorder.

The preprocessing of electrocardiograph signals carried out in the data collection section substantially eliminates all intermediate recording of the electrocardiograph data in that an electrocardiograph signal input is processed directly for R-R interval range counts stored in separate locations in a memory bank. The readout device then need only sequentially read the data in the memory bank and convert the contained R-R interval range counts to suitable graphical signals dependent on the graphical display desired.

In the data collection section of the present invention, the time interval between R pulses of the electrocardiogram waveform is measured by counting pulses having a predetermined time period. The pulse count being an indication of the particular range of R-R time intervals. A particular range count register is then incremented by one count. Each range count register has a capacity such that the data collection section can collect R-R interval information for considerable periods of time without an overflow. Additionally, the memory banks employed the presently preferred embodiment of the invention are micro-miniature in size resulting in an extremely small overall size for the data collection section. The section may then conveniently be worn by a patient engaged in substantially normal every day activity.

The portion of the time interval between R pulses of the electrocardiograph signal during which the following R pulse should not occur is used to advantage in the data collection section of the present invention in that the sequential cycle control which governs the section utilizes that first portion to increment the particular range count register and only then begins a count in an interval counter proportional to the usable portion of the time interval between R pulses. Therefore, the interval counter need have a capacity only sufficient to generate a sufficient count of clock pulses in that useful range. In so doing, the resolution of the count in that useful range is also enhanced.

In the readout section of the instrument system of the present invention, a unique system of processing the data in the memory bank is employed to enhance the meaningful interpretation of the generated R-R interval histogram. In particular, it is expected that interval range counts will be high and clustered around normal heartbeat intervals and the counts will be low at the ends of the histogram. Therefore, more meaningful results are obtained if the logarithm of the total count is plotted instead of the actual count to enhance the range counts outside the expected normal range. The range count processing technique utilized in the readout section of the present invention provides for the generation of a readout signal which is an approximation of the logarithm of the count which is substantially correct over an extremely wide range of input counts. In this respect, a particular range count is binarily shifted in the direction of the most significant bit until a 1 appears at the most significant bit position of a shift register. The number of shifts required to accomplish this is then inversely proportional to the characteristic of the logarithm of the binary range count. The shift count is inverted, converted to an analog signal and applied to a summing junction. The remaining bits in the binary range count number are then processed to convert a number of the more significant digits to analog form to form the mantissa of the logarithm which is also applied to the summing junction with the resulting input to that junction being the complete characteristic plus mantissa of the logarithm. The number of significant digits converted to analog form depends upon the resolution of the particular analog device being driven.

The readout section of the R-R interval histogram system also includes a novel sequential stepping control to sequentially operate the chart motor and pen motor of the chart recorder employed to generate the actual histogram. Control signals to the chart motor and pen motor are alternately applied under the control of a sequential clock with the result that the only variable signal required is the analog amplitude voltage corresponding to the logarithm input to the summing junction.

In an alternate embodiment of the histogram instrument system of the present invention, the interval count from a previous R-R interval is compared with a present R-R interval to obtain the difference between those intervals rather than their absolute values. In utilizing the alternate embodiment of the invention, the address of the range count register corresponding to the zero time interval difference would be weighted so that the approximately center range count register would be incremented for zero time interval differences and the range count registers in either direction from the approximate mid point would be incremented for positive or negative differences.

In utilizing the alternate embodiment, the readout section operates substantially the same with the only difference being the interpretation of the resultant R-R interval difference histogram.

Thus, it can be seen that the R-R integral histogram instrument system of the present invention provides a versatile and useful tool for generating R-R interval histograms over wide ranging conditions and can be employed over relatively long time periods. The data collection section of the system employs a unique preprocessing system substantially eliminating all intermediate processing steps to obtain a direct proportional interval range count in a memory bank. The readout section of the instrument system employs a unique technique for generating an approximate logarithm of an interval range count having a relatively wide variation.

DESCRIPTION OF THE PREFERRED EMBODIMENT

Figure 1:
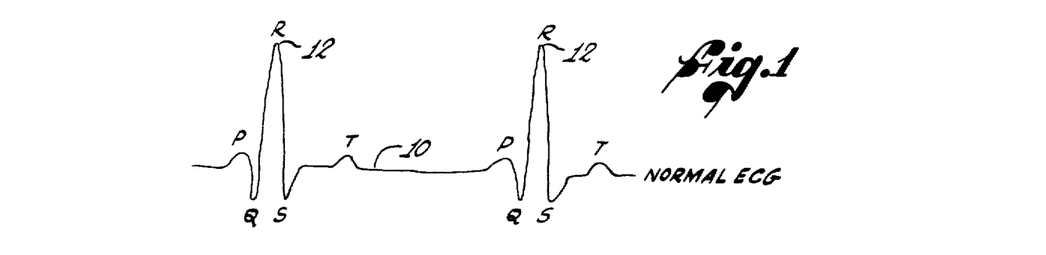
FIG. 1 is a graphical representation of the waveform of a normal electrocardiogram.

Turning now to the drawings, and particularly FIG. 1 thereof, the R-R interval histogram instrument system of the present invention is designed to accept as input a normal electrocardiogram waveform 10. Such a waveform is normally described as having four distinct points labeled P Q R S T. While the entire waveform may be processed to find the interval between heartbeats, the most commonly accepted technique is to sense by some means, such as electronic circuitry, the R pulses 12 which are the most prominent feature of the normal electrocardiogram waveform. Accordingly, a bar graph of the relative frequencies of particular intervals between the R pulses of the waveform is known as an R-R interval histogram.

Figure 2:
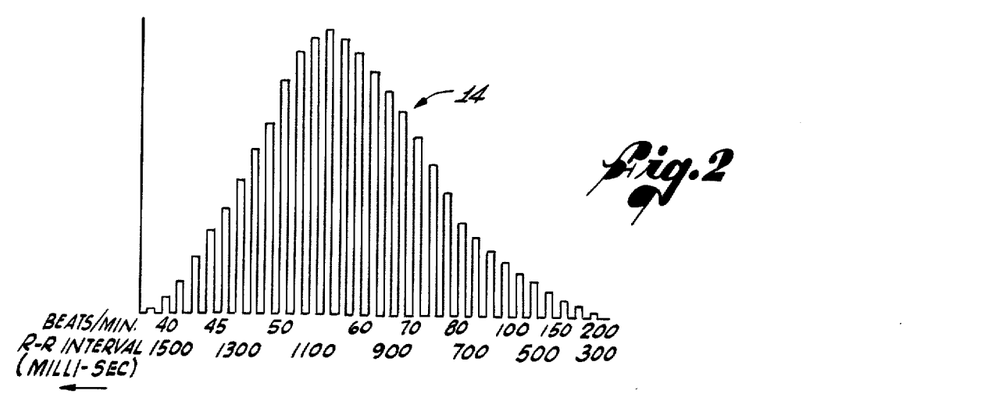
FIG. 2 is a graphical representation of an R-R interval histogram produced by the instrument system of the present invention.

The instrument system of the invention is designed to sense the normal electrocardiogram waveform such as shown in FIG. 1 by means of conventional ECG electrodes attached to the patient to be monitored, the sensed waveforms are electronically processed to detect only the R pulses 12 and deliver the R pulse signals to the rest of the system. The electrodes are attached to a data collection section of the instrument system which is normally worn on the person of the patient to be monitored. The data collection section is completely portable and of small size so that the patient may engage in substantially normal activity while wearing the data collection section. Following the completion of a predetermined monitoring period, the data collection section is removed from the patient and is attached to a readout section which accepts the stored R-R interval count data and generates an R-R interval histogram 14 having a format such as that shown in FIG. 2. The histogram 14 comprises a series of bar graphs indicating the relative frequency of occurrence of particular time interval spacings between heartbeats. Thus, there are two common scales for those intervals, the R-R interval which for human beings measures between 300 and 1500 milliseconds or 20.0 to 240 beats per minute respectively. The vertical axis of the histogram shown in FIG. 2 is the relative frequency of occurrence of R-R intervals falling within the ranges specified by the bar graph.

Figure 3:
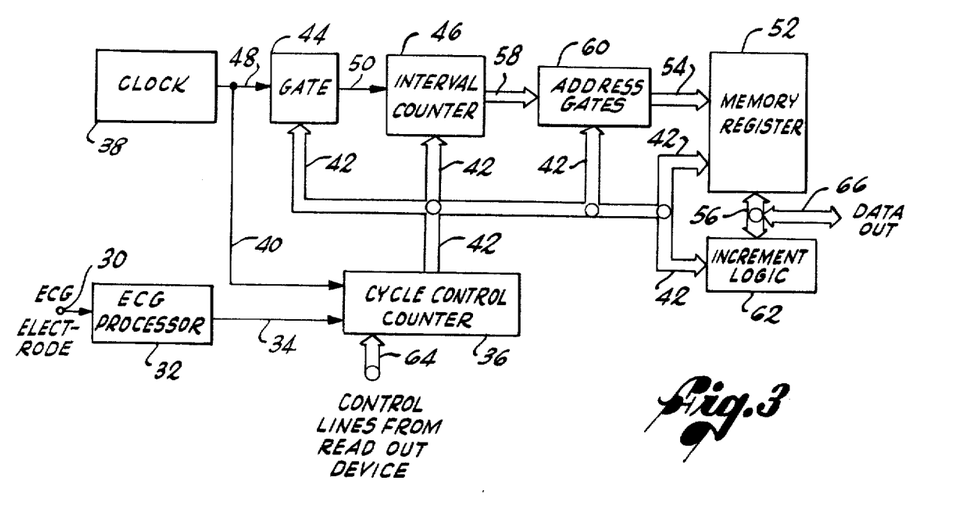
FIG. 3 is a block diagram of the data collection section of the R-R interval histogram instrument system.

The R-R interval data is collected by the data collection section of the instrument system of the invention which is generally insulated by the block diagram shown in FIG. 3. The overall control of the data collection section is a function of the R pulse section of the electrocardiograph waveform and enters the data collection section through an electrocardiograph (ECG) electrode input 30. As discussed above, the electrocardiogram waveform is processed by an ECG processor 32 to detect only the R pulses 12 of the waveform which are sent over a line 34 to a cycle control counter 36 which controls the overall sequential operation of the data collection section. The basic sequential stepping of the cycle control counter is governed by a clock 38 which generates clock pulses at a predetermined rate keyed to the time interval measurement for the R pulses entering the cycle control counter 36 via the line 34. The clock pulses generated by clock 38 are also fed into the cycle control counter via the line 40.

The cycle control counter is connected to the other functional elements of the data collection section except the clock 38 by means of a control bus 42 and are operated by means of various combinations of control signals which are generated by the cycle control counter 36.

The basic operation of the data collection section is as follows. Immediately following the generation of an R pulse on line 34, the cycle control counter generates a control signal on bus 42 to open a gate 44 which permits clock pulses from clock 38 to pass to an interval counter 46 via the lines 48 and 50. The count in the interval counter upon receipt of the following R pulse on line 34 is indicative of the elapsed time interval since the previously received R pulse. In the construction format of the present invention, the count in the interval counter 46 represents a particular time interval range, the periodic occurrence of which is to be counted. Therefore, the count in a storage position indicating that particular interval range must be incremented. This is effected as follows.

A memory register bank 52 is provided which has a plurality of range registers each of which can be individually addressed by means of an address bus 54. When a range register is addressed, its contents become available on an input-output bus 56. The count stored in the range count register indicates the number of times that particular R-R interval has occurred during the monitoring period. Therefore, in response to that R-R count appearing in the interval counter 46, the range register corresponding to that range interval must be incremented by 1. Therefore, the interval count is applied via the bus 58 to a plurality of address gates 60 which are enabled via a control line on control bus 42 to apply the interval count to the address bus 54 to the memory register bank 52. Thus, the range register corresponding to that interval count becomes available at the input-output bus 56 and a suitable control signal via the control bus 42 is applied to both the memory register bank 52 and an increment logic block 62 which contains an adder into which the range count in the register is gated. Another suitable control signal on bus 42 causes the adder in the increment logic 62 to add 1 binary bit to range count and a following control signal on bus 42 causes the incremented range count to be written back into the range count register in the memory register bank 52.

Following the incrementing of the particular range register in the memory register bank 52, suitable control signals from the cycle control counter 36 via control bus 42 to inhibit the address gates 60, reset the interval counter 46 and open the clock gate 44 to permit clock pulses from clock 38 to again enter the interval counter 46.

The interval counter 46 then counts clock pulses from clock 38 until the next R-pulse on line 34 is received by the cycle control counter 36. It should be appreciated that the fact that the interval counter 46 is not counting clock pulses from clock 38 continuously between receipt of the R-pulses on line 34. This type of operation is permitted due to the fact that there is a first portion of the time interval between R-pulses when the following R-pulse cannot be received. This is due to the physical requirement that a discrete interval pass between heartbeats. Therefore, the interval counter begins counting only when the receipt of an R-pulse is possible and a first portion of a time interval between R-pulses is used to advantage in incrementing the range register in the memory register bank 52. By using this procedure, the size of the interval counter 46 is greatly reduced as well as the total count required to address the memory register bank.

It should be appreciated that the basic block diagram of the data collection section of the instrument system of the invention illustrated in FIG. 3 also includes numerous error-prevention devices such as overflow control logic connected to the interval counter 46 and to the particular range registers in the memory register bank 52. Therefore, should one of the range registers reach its full capacity (16 binary bits in the preferred embodiment) the further operation of the collection section would stop. Similarly, if the interval counter 46 should reach its maximum (6 bits in the preferred embodiment) before a following R-pulse is received on line 34, the operation of the system will also stop.

When the range counts start in the range count registers in the memory register bank 52 are to be read out, the data collection section is connected to the readout section, to be described below, and a control line bus 64 from the readout section operates in conjunction with the normal memory register bank addressing technique described above to cause the content of the range count registers in the memory register bank 52 to be sequentially read onto the input-output line bus 56 and concurrently on a data out bus 66, to the readout section. Thus, the data collection section serves the dual function of both operating independently for the collection of data and operating in conjunction with the circuits of the readout section to read the data stored in the memory register bank 52 to the readout device for final processing. Therefore, considerable expense and space is saved by having the components of the data collection section serve a dual purpose. Circuit details for the preferred embodiment of the data collection section are given in FIGS. 6a and 6b.

As briefly mentioned above, the readout section accepts data stored in the data collection section and converts it into analog graphical data which is applied to a suitable graph generating device such as a strip chart recorder used in the presently preferred embodiment of the invention. The operation of the readout section is illustrated in the basic block diagram of FIG. 4. As shown, the two-way data bus 66 passes through a bank of erase switches 68 to a 16-bit shift register 70. The 16-bit contents of the range count register is then transferred in parallel to the 16-bit shift register 70 in one-bit time. The control line bus 64 from a control counter 72 then inhibits the further operation of the data collection section shown in FIG. 3. The operation of the control counter 72 is in accordance with clock pulses on a line 74 generated by a clock 76. It should be noted that the frequency of the clock 76 is geared to the operation of the mechanical sections of the particular chart recorder employed and is generally much slower than the clock 38 of the data collection section. The particular 16-bit shift register 70 employed in the presently preferred embodiment of the invention will accept data in parallel but will output data only in serial form. Therefore, in order to consider the first eight bits of the range count in the shift register 70, the control counter 72 generates suitable control signals on the control bus 64 to shift the contents of the register 70 eight times to transfer the first eight bits to the 8-bit shift register 76 where the data can be considered in parallel. As briefly noted above, the logarithm of the range count is generated by finding first the characteristic of that logarithm which can be analogized to finding the number of shifts necessary to obtain a one in the most significant bit position of the eight-bit shift register 76. Therefore, under the control of the control counter 72 the data in the eight-bit shift register is shifted one bit at a time until a "1" appears on the most significant bit line 78. The "1" appearing on line 78 signals the control counter 72 to stop shifting. For each shift in register 76, a five-bit counter 80 is incremented by the control counter 72 over the control line 64. The count in the five-bit counter 80 is representative of the binary inverse of the characteristic of the desired logarithm. Therefore, the contents of the five-bit counter 80 are passed through a bus 82 to an inverter 84 which sends the compliment of the count in counter 80 over another bus 86 to a digital-to-analog converter 88 which generates an analog signal fed via a line 90 to a summing point or a summing amplifier 92.

Figure 4:
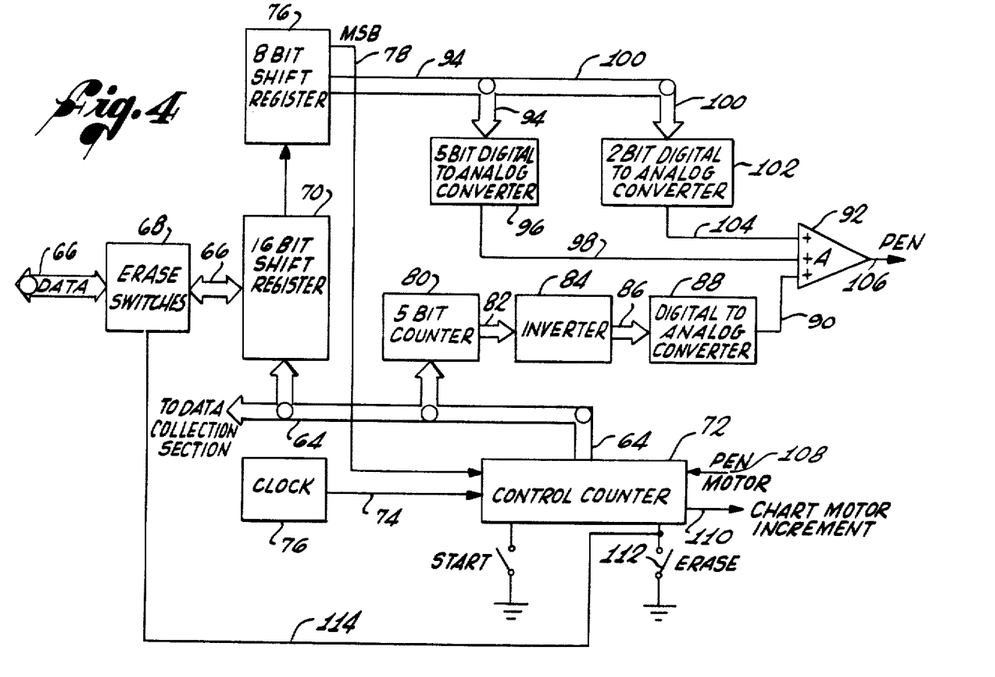
FIG. 4 is a block diagram of the read out section of the histogram instrument system.

The lesser significant bits in the 8-bit shift register 76 are then converted to the mantissa of the logarithm by means of analog-to-digital converters. In has been found that the resolution of the particular chart recorder utilized with the presently preferred embodiment of the invention, may be achieved by considering only the next five significant bits in the shift register 76 following the most significant bit on line 78. Therefore, only the next five bits are connected via a bus 94 to a five-bit digital-to-analog converter 96 which converts the binary number of those five bits to an analog signal which is also connected via a line 98 to the summing amplifier 92. The first two more significant bits of the five bits considered in shift register 76 are also fed via a bus 100 to a two-bit digital-to-analog converter 102 which converts the more significant binary number to an analog signal which is connected via a line 104 to the summing amplifier 92.

The result of the combination of the analog characteristic signal on line 90 and the combined analog signal of the next five bits line 98 and the analog signal of the two more significant bits on line 104 results in an output signal on line 106 to the pen motor of the chart recorder which is a very close approximation of the logarithm of the original binary range count taken from the memory register bank 52 of the data collection section. Circuit details for the operation of the readout section shown in FIG. 4 are given in FIGS. 7a and 7b.

It should be noted that the analog signal on line 106 delivered to the pen motor causes the conventional servomechanism operation of moving the pen along the pen axis until the pen driving servomechanism indicates that the pen is in the proper position which then generates a suitable signal on a pen motor input line 108 to signal the control counter to increment the chart motor. The control counter 72 then generates a chart motor increment signal on line 110 for one clock period as governed by the clock 76 and the pen motor signal on line 106 is removed causing the pen to return to the nominal zero axis as indicated by the signal on the pen motor line 108 which signals the control counter to again increment the chart motor via the control line 110 to move the pen and chart to the new bar graph axis. The control counter 72 then generates suitable control signals over the control bus 64 to the data collection section to increment the interval counter to address the next range count register in the memory register bank 52, which is then shifted into the 16-bit shift register 70 in the readout section as described before. Therefore, the readout section illustrated in FIG. 4 sequentially causes the graphical plotting of each range count register in the memory register bank 52 to be recorded as a bar graph with the amplitude of the bar representing the logarithm of the binary count in the range count register. The readout section continues to sequence through the memory register bank until all of the range count registers have been charted, at which time the readout section stops its operation.

The R interval histogram may be generated as many times as desired merely by pressing the start button after the readout section has completed its operation. However, if the data collection section is to be used again, the binary counts in the range count registers of the memory bank 52 must be erased. This is accomplished by pushing an "erase" switch followed by the pushing of the "start" switch 112 which conditions the erase switches 68 in a closed condition via the control line 114, from the erase switch. The control counter 72 then causes the data to be sequentially addressed again, but when the data is read back into the memory bank, the erase switches cause "0"s to be entered in all register positions. The data collection section is then ready to be used again.

Figure 5:
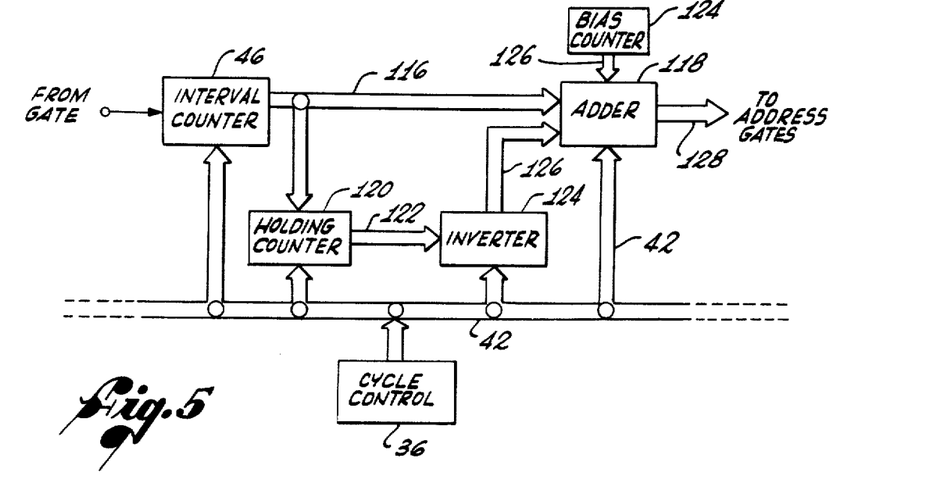
FIG. 5 is a block diagram of an alternate embodiment of the data collection section for producing an R-R difference histogram.

As briefly discussed above, an alternate format for the R-R interval histogram is the R-R difference histogram in which the difference between a previous time interval and a present time interval is determined with the difference ranges being counted as opposed to actual absolute value of time interval ranges. A basic block diagram for effecting this operation in the data collection section is illustrated in FIG. 5. In this figure, portions of the function blocks of FIG. 3 are reproduced while others are eliminated as unnecessary to the description of the modified operation. In the operation of the system shown in FIG. 5, the cycle control counter 36 operates the interval counter and the remaining functional blocks in this same manner as described for FIG. 3. However, when the R pulse cuts off the pulses from the gate to the interval counter 46, the cycle control counter causes the interval counter to transfer the interval count over the data bus 116 to an adder 118. Simultaneously, appropriate control signals from the cycle control counter 36 on the control bus 42 cause the contents of a holding counter 120 to pass via a data bus 122 through an inverter 124 through a data bus 126 to the adder 118. The contents of the holding counter are the previously generated interval count. Thus the summation of the contents of the interval counter and the contents of the holding counter would be the difference between the present interval count and the prior interval count, the result being a difference interval count. However, in order to properly store a zero interval count in the memory register bank 52 of FIG. 3 and still be able to store positive or negative difference counts, the zero difference count would have to be stored at approximately the center count register of the memory bank 52. Therefore, a bias count from block 124 is also inserted into the adder via the data bus 126, the bias count being the address of the middle range count register. Therefore, the output on the data bus 128 to the address registers is the sum of the bias count, the present count, and the previous count, resulting in a stored count indicating a zero, positive or negative difference in the interval counts.

It should be appreciated that the operation of the R-R difference histogram storage technique shown in FIG. 5 does not affect the operation of the readout section illustrated in FIG. 4. The reading out of the data stored in the range count registers will be the same but the resulting graph will be interpreted differently.

Figure 6A:
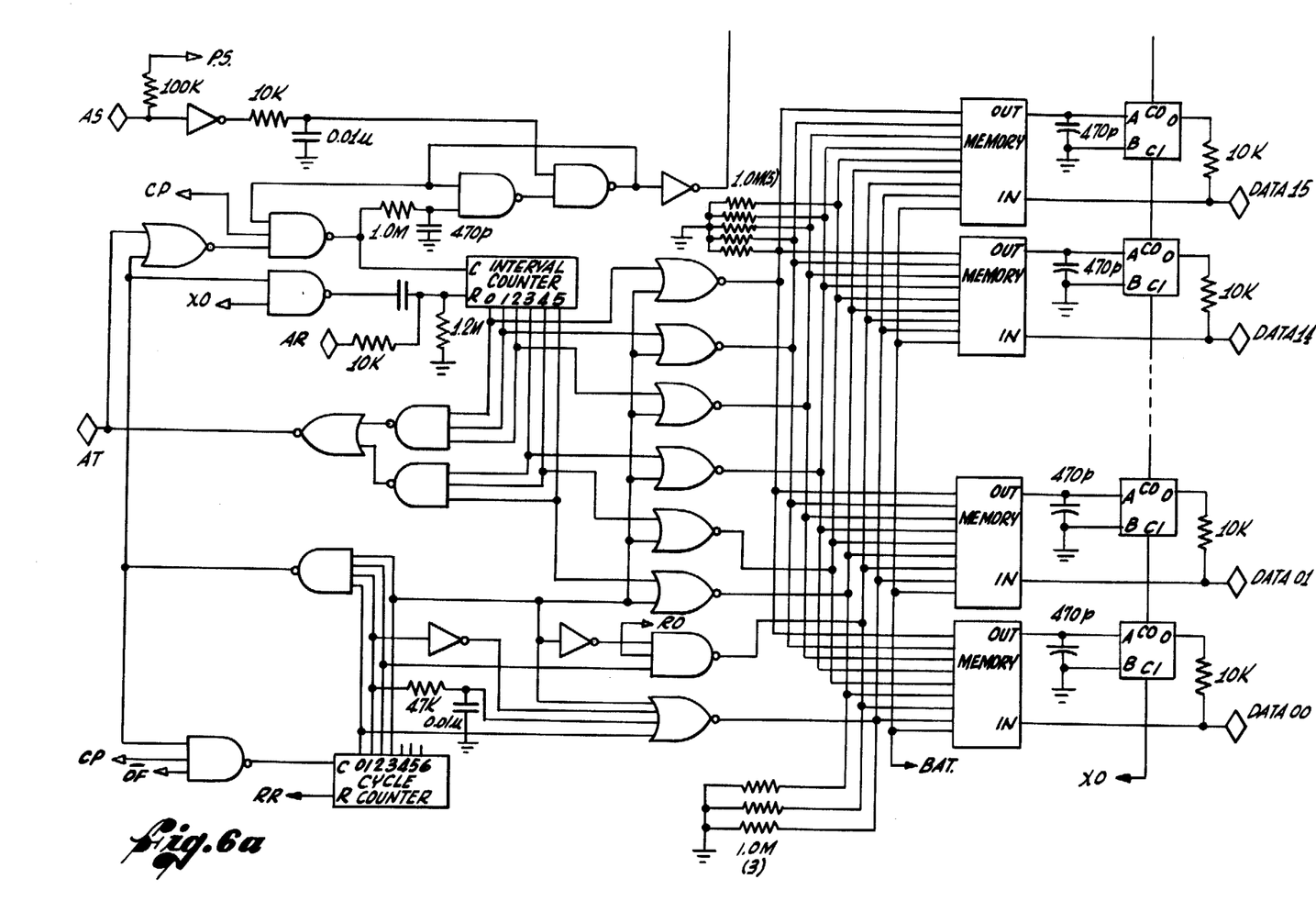
FIG. 6a is a logic diagram of the interval counter, the cycle control counter, and the memory bank sections of the data collection section.
Figure 6B:
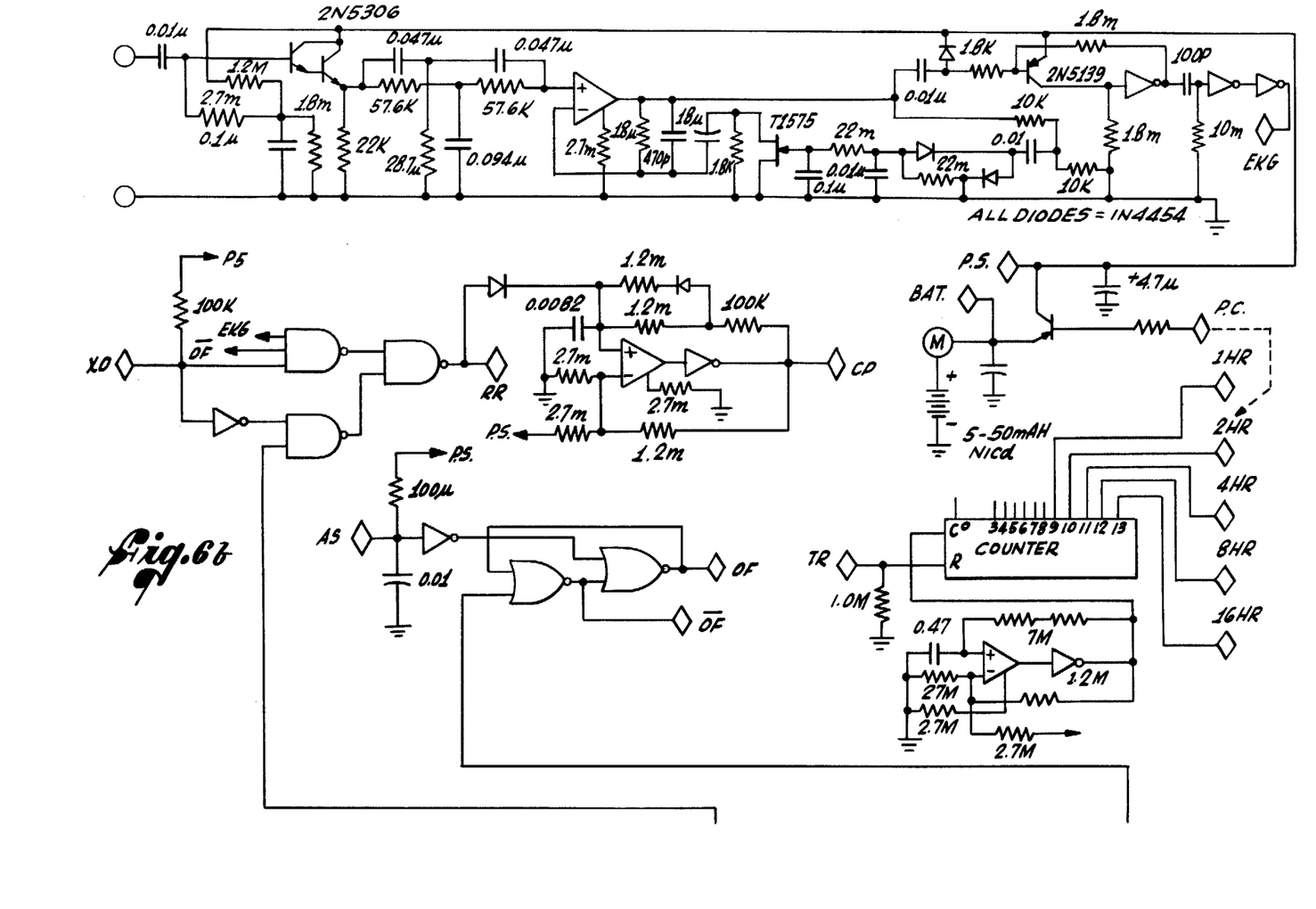
FIG. 6b is a logic diagram of the ECG processor and various timing sections of the data collection section.
Figure 7A:
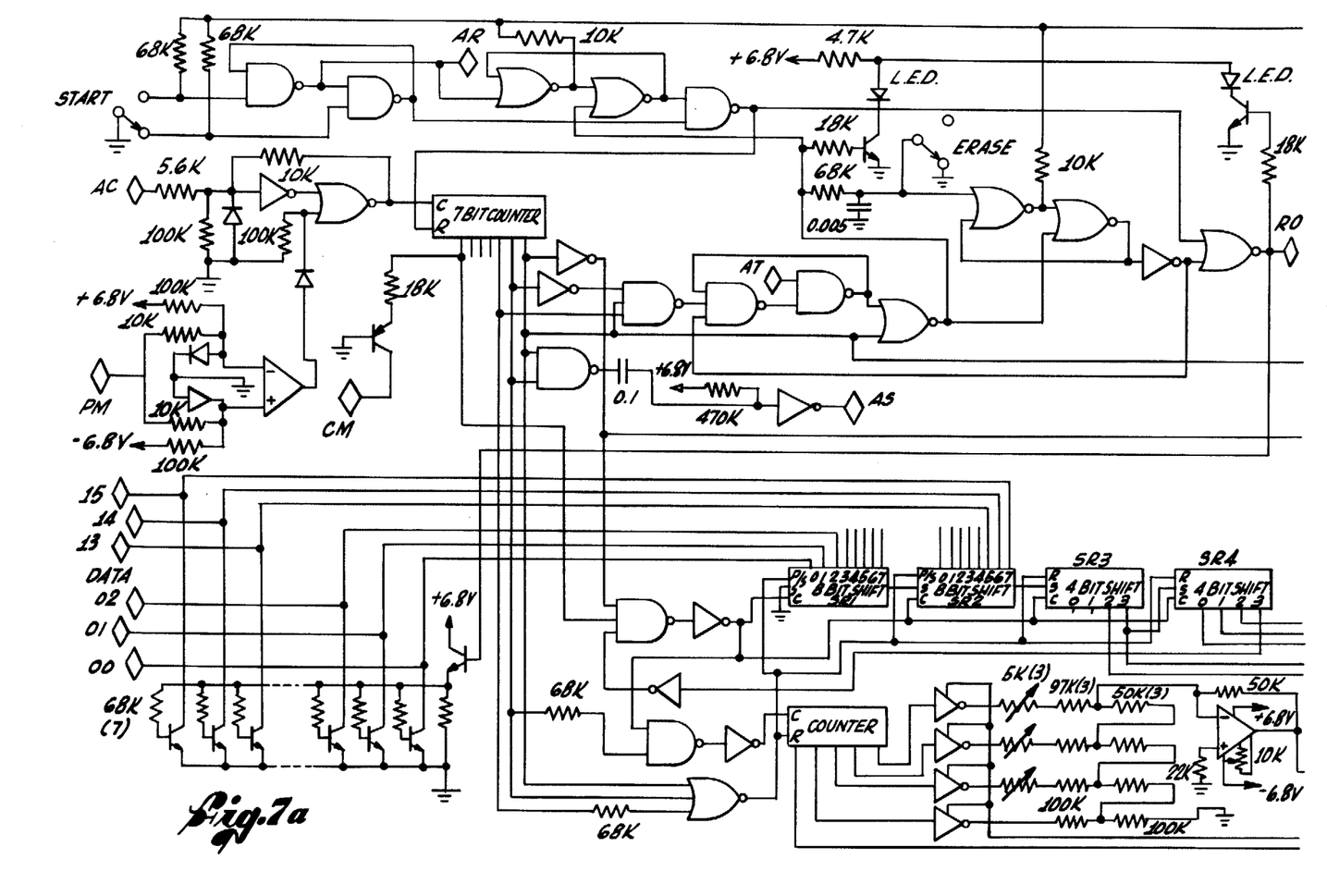
FIG. 7a is a logic diagram of a portion of the readout section of the instrument system of the invention.
Figure 7B:
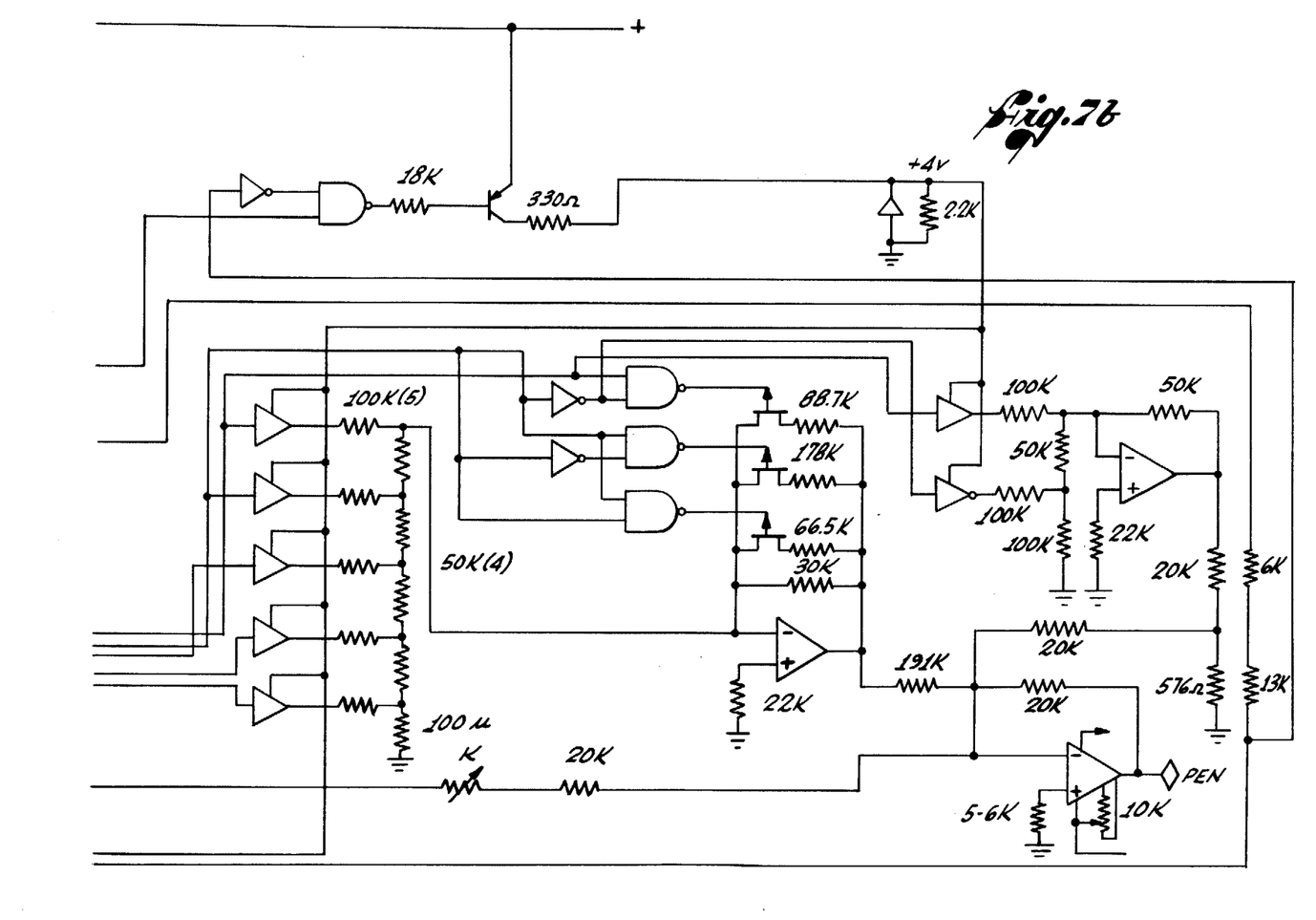
FIG. 7b is a logic diagram of the remaining portion of the readout section.

FIGS. 6a and 6b show an illustrative circuit for the data collection section of the R-R interval histogram instrument system of the presently preferred embodiment of the invention. FIGS. 7a and 7b are a representative circuit of the readout section of the invention. In FIGS. 6 and 7, the logic is complimentary MOS and are constructed of CD 400 (RCA), MC 14000 (Motorola) or CM 4000 (Solitron). The memory units are Motorola MCM 14505 CL. Discrete transistors may be of any common type such as the 2N5139.

While a particular implementation of the R-R interval histogram instrument system of the present invention has been described in detail, it should be appreciated that numerous alternative embodiments may be utilized to practice the invention. Therefore, the invention is not to be limited except by the following claims:

We claim:

1. An apparatus for generating an R-R interval histogram comprising:
   data collection means including,
      means for measuring the time intervals between the R portions of an electrocardiogram waveform,
      means for determining the number of predetermined time periods which elapse during each of said time intervals,
      means for generating time interval range signals corresponding to said numbers,
      means for storing said range interval signals as accumulating counts in a plurality of addressable counters with an address for each counter corresponding to a particular time interval range; and
   readout means selectively connectable to said data collection means including,
      means for addressing said addressable counters and reading out said counts stored therein, means for displaying said readout counts as a bar graph having range intervals along one axis and corresponding counts along the other axis.

2. The apparatus defined in claim 1 wherein said data collection means includes:
   means for holding a time interval signal;
   means for subtracting said held time interval signal from a present time interval signal to generate a difference time interval signal.

3. The apparatus defined in claim 1 wherein said readout means includes:
   means for generating a readout signal proportional to the logarithm of the particular count in said counter means.

4. The apparatus defined in claim 3 including shift register means for receiving said particular count and shifting said count until a "one" appears in the most significant bit position of said shift register, the number of shifts being proportional to the characteristic of the logarithm of said particular count.

5. The apparatus defined in claim 4 including:
   digital to analog converter means for converting the contents of said shift register to an approximation of said logarithm.

6. A method of generating an R-R interval histogram comprising the steps of:
   collecting in a data collection means R-R interval data and sorting R-R interval ranges onto counts in an addressable counter memory, said counts being proportional to the frequency of occurrence of said ranges; and
   reading out into a readout means selectively connectable to said data collection means said counts by sequentially addressing said counter memory and generating a bar graph having R-R interval ranges along one axis and corresponding counts along the other axis.

7. The method defined in claim 6 including the steps of:
   holding a prior count and taking the difference between said prior count and a present count to produce R-R difference interval signals.

* * * * *